United States Patent [19]

Tsutsui

[11] 4,095,240

[45] June 13, 1978

[54] EXHAUST SYSTEM FOR PYROGRAPHIC PRINTER

[75] Inventor: Takayuki Tsutsui, Ebina, Japan

[73] Assignee: Xerox Corporation, Stamford, Conn.

[21] Appl. No.: 722,945

[22] Filed: Sep. 13, 1976

[51] Int. Cl.² .............................................. B41M 5/00
[52] U.S. Cl. ..................... 346/163; 219/216
[58] Field of Search ............... 346/139 R, 162, 163, 346/165, 155; 358/300; 219/216

[56] References Cited

U.S. PATENT DOCUMENTS

| 2,739,029 | 3/1956 | Pollard | 346/162 |
| 2,860,180 | 11/1958 | McConnell | 346/165 |
| 3,436,785 | 4/1969 | Kantor | 346/165 |

FOREIGN PATENT DOCUMENTS 2,339,842  2/1975  Germany ..................... 346/162

Primary Examiner—Jay P. Lucas

[57] ABSTRACT

A pyrographic printer comprises an exhaust system having an elongated inlet and a bifurcated throat. The inlet is adjacent to and substantially coextensive with the path of travel for the stylus, and the throat is configured to define a main passage which leads away from the inlet and a branch passage which loops back toward the inlet. To increase the vacuum drawn in the immediate proximity of the stylus, the input impedance of the exhaust system is selectively reduced in that region. For that purpose, the stylus carriage carries a baffle which extends into the throat to more or less seal a stylus aligned segment of the branch passage.

6 Claims, 4 Drawing Figures

EXHAUST SYSTEM FOR PYROGRAPHIC PRINTER

BACKGROUND OF THE INVENTION

This invention relates to pyrographic printers and, more particularly, to exhaust systems for disposing of the gaseous and solid waste products produced by electroresistive printing processes and the like.

Electroresistive printing is one of the better known pyrographic printing processes. It basically involves controlling the current flow between a stylus and a conductive substrate for an electroresistive recording medium to burn off localized areas of an overcoating on the recording medium, thereby exposing a contrasting underlying layer in an image configuration. As a general rule, there is relative motion between the stylus and the recording medium so that the stylus traverses the recording medium in accordance with a predetermined scanning pattern. For example, in the Xerox 400 Telecopier and Telecopier 410 facsimile transceivers, which are manufactured and sold by Xerox Corporation, electroresistive paper is wrapped on a rotating drum to be more or less helically scanned by a stylus which is advanced axially of the drum.

Unfortunately, eletroresistive and other pyrographic printing processes are accompanied by the release of waste products, including aromatic gases, visible smoke, and particulate matter. The aromatics create objectionable odors, while the smoke and particulate matter tend to deposit a soot-like residue.

Others have already recognized that the environment contamination attributable to the waste products of pyrographic printing can be reduced, if not completely eliminated, by suitable exhaust systems. A case in point is the Xerox Telecopier 410 units which have exhaust systems of the type described and claimed in a commonly assigned U.S. Pat. No. 3,840,880 which issued Oct. 8, 1974 on an application of Hans Peter Kramell entitled "Filtering System for Pyrographic Recorders." Indeed, to simplify this disclosure, that patent is hereby incorporated by reference.

SUMMARY OF THE INVENTION

One of the primary goals of the present invention is to provide methods and means for increasing the efficiency of exhaust systems for pyrographic printers.

More particularly, an important object of this invention is to provide methods and means for selectively increasing the vacuum drawn in the immediate vicinity of a stylus for an electrostatic printer or the like by an exhaust system having an elongated inlet. A more detailed related object is to provide reliable and economical methods and means for selectively reducing the aerodynamic input impedance of the exhaust system in the immediate proximity of the stylus as the stylus advances lengthwise of the inlet to the exhaust system.

Briefly, to carry out these and other objects of this invention, a pyrographic printer comprises an exhaust system having an elongated inlet and a bifurcated throat. The inlet is adjacent to and substantially coextensive with the path of travel for the stylus, and the throat is configured to define a main passage which leads away from the inlet and a branch passage which loops back toward the inlet. To increase the vacuum drawn in the immediate proximity of the stylus, the input impedance of the exhaust system is selectively reduced in that region. For that purpose, the stylus carriage carries a baffle which extends into the throat to more or less seal a stylus aligned segment of the branch passage.

BRIEF DESCRIPTION OF THE DRAWINGS

Still further objects and advantages of the present invention will become apparent when the following detailed description is read in conjunction with the attached drawings in which.

DETAILED DESCRIPTION OF THE ILLUSTRATED EMBODIMENT

While the invention is hereinafter described in some detail with reference to a single exemplary embodiment, it should be understood at the outset that there is no intent to limit it to that embodiment. On the contrary, the aim is to cover all modifications, alternatives and equivalents falling within the spirit and scope of the invention as defined by the appended claims.

Figure 1:
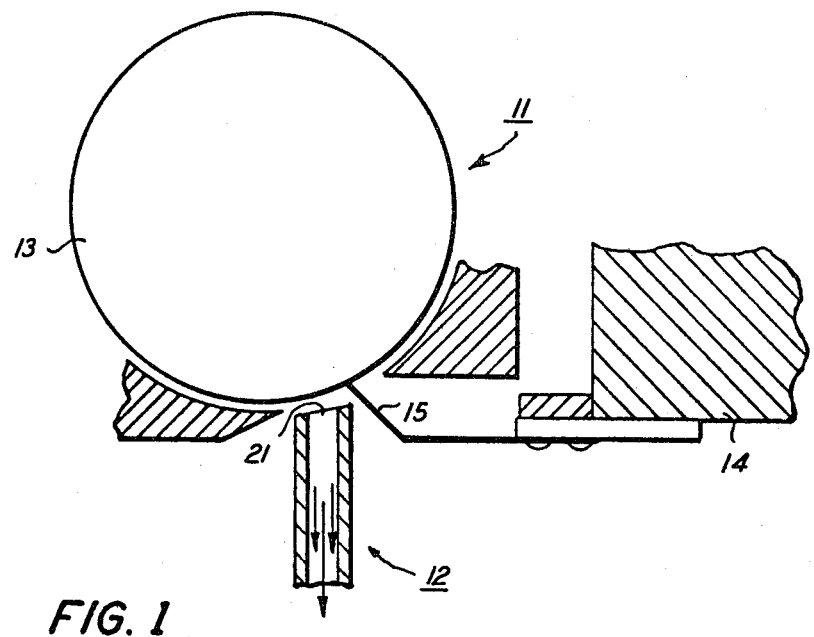
FIG. 1 is a fragmentary sectional view showing a conventional exhaust system for an electroresistive printer.

Turning now to the drawings, and at this point especially to FIG. 1, there is an electroresistive-type pyrographic printer 11 which is equipped with a conventional exhaust system 12.

As illustrated, the printer 11 comprises a drum 13 for supporting an electroresistive recording medium (not shown) and a carriage 14 for supporting a stylus 15. In operation, the recording medium is wrapped around the drum 13 and is traversed in accordance with a substantially helical scanning pattern by the stylus 15. To generate that scanning pattern, the drum 13 is rotatable driven (by means not shown) and the carriage 14 is linearly driven (by additional means not shown) to translate the stylus lengthwise of the recording medium along a path which is essentially parallel to the axis of rotation of the drum 13. The printing is carried out by controlling the current flow between the stylus 15 and the drum 13 so that localized areas of an overcoating on the recording medium are burned away to expose a contrasting underlying area of the recording medium in an image configuration.

Gaseous and solid waste products released by the printing process are at least partially captured by the exhaust system 12. Those waste products are released into an area of turbulent air flow because of the rotation of the drum 13 and the movement of the stylus 15. Thus, as taught by the aforementioned U.S. Pat. No. 3,840,880, the exhaust system 12 has a drum length inlet opening 21 which is advanced a few degrees ahead of but otherwise adjacent to the path of travel for the stylus 15. A suitable air moving device (not shown) within the exhaust system 12 maintains a partial vacuum along substantially the full length of the drum 13 to continuously collect waste products from everywhere along the length of the drum 13.

As is known, an alternative for more sharply focusing the vacuum in the area in which the waste products are released is to use an exhaust system having a nozzle-like head which travels with the stylus. However, that eliminates the advantage of being able to capture waste products which are temporally suspended in the turbulent air.

Figure 2:
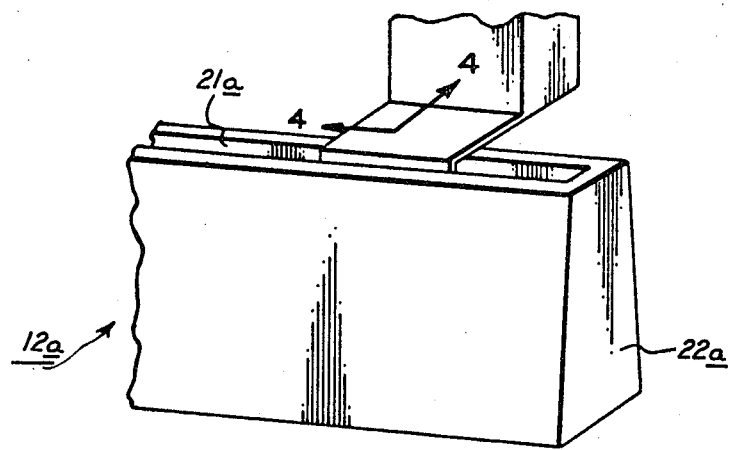
FIG. 2 is a fragmentary perspective view of an exhaust system embodying the present invention.
Figure 3:
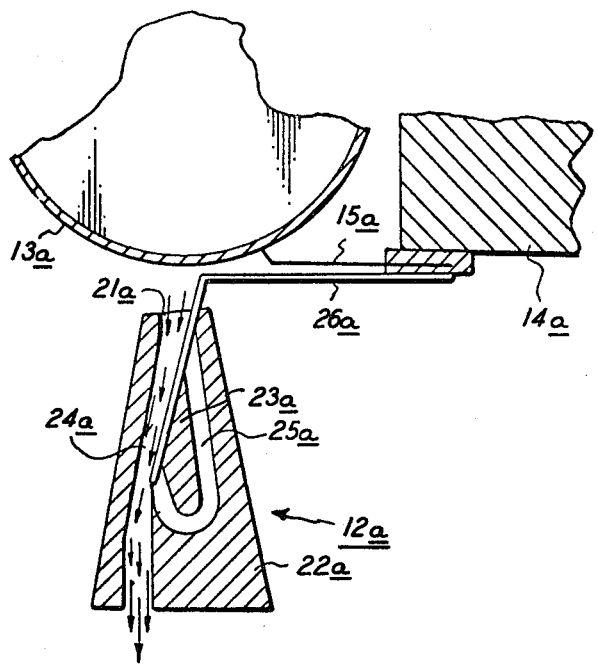
FIG. 3 is a fragmentary sectional view of an electroresistive printer equipped with the exhaust system shown in FIG. 2.
Figure 4:
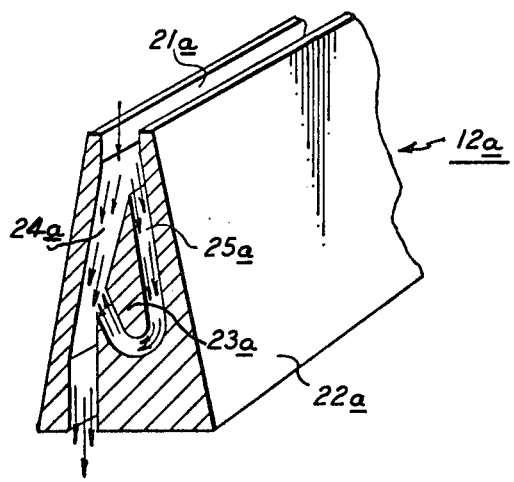
FIG. 4 is a fragmentary perspective view in sectional form to illustrate the exhaust system of FIGS. 2 and 3 in additional detail.

Referring to FIGS. 2-4, in accordance with the present invention, there is an exhaust system 12a which synergistically combines the continuous waste collection action of an elongated inlet with the vacuum focusing action of a nozzle-like head. In many respects, the exhaust system 12a is similar to the exhaust system 12. Therefore, like reference numerals are used to identify like parts, with the suffix a being added to distinguish between the two systems.

In keeping with this invention, the exhaust system 12a has an elongated inlet opening 21a and a bifurcated throat 22a. Again, the inlet 21a extends substantially the full length of the drum 13a in position essentially adjacent to the path of travel of the stylus 15a. A suitable air moving device (not shown) within the exhaust system 12a draws a partial vacuum along the full length of the drum 13a. However, the vacuum is stronger or more complete in the immediate proximity of the stylus 15a than elsewhere along the drum 13a.

More particularly, to carry out this invention, there is an air flow splitter 23a which extends lengthwise of the throat 22a just inwardly of the inlet 21a to define a main air flow passage 24a and a branch air flow passage 25a. The main passage 24a leads away from the inlet 21a, but the branch passage 25a loops back toward the inlet 21a. Consequently, air drawn through the branch passage 25a creates a countercurrent to the air drawn through the main passage 24a, thereby establishing a high aerodynamic input impedance for the exhaust system 12a.

To selectively increase or strengthen the vacuum drawn in the immediate proximity of the stylus 15a, there is a baffle 26a for at least partially sealing a stylus aligned segment of the branch passage 25a. The baffle 26a is mounted on the carriage 14a for movement with the stylus 15a and extends into the throat 22a to slidingly engage the branch passage side of the main passage 24a. The extension of the baffle 26a is generally perpendicular to the path of travel of the stylus 15a to maintain the desired alignment and is of sufficient length to overlie the ports leading to and from the branch passage 25a. Accordingly, the baffle 26a dynamically reduces the aerodynamic input impedance of the exhaust system 12a in a localized area surrounding the stylus 15a, thereby strengthening the vacuum drawn in that area.

CONCLUSION

In view of the foregoing, it will now be understood that the exhaust system provided by this invention maintains a non-uniform vacuum along the path of travel for the stylus of pyrographic printer and that the strongest portion of the vacuum is maintained in alignment with the stylus as the stylus advances along a recording medium. That, of course, increases the efficiency of the exhaust system by concentrating its air moving capacity on the area into which the gaseous and solid waste products of the printing process are released. Moreover, it will be evident that exhaust system is economical to manufacture and reliable in operation.

What is claimed is:

1. In combination with a pyrographic printer having a stylus mounted for movement along a predetermined path to print an image on a recording medium, an exhaust system for collecting waste products released by said recording medium as the image is being printed; said exhaust system comprising means for defining an elongated inlet opening substantially adjacent to and coextensive with the entire path of movement for said stylus;

means for establishing a non-uniform vacuum substantially entirely along said inlet opening, including means for maintaining a relatively strong portion of said vacuum in alignment with said stylus as said stylus moves along said path.

2. The combination of claim 1 wherein said means for establishing said vacuum includes a throat having a main passage leading away from said inlet and a branch passage looping back toward said inlet, and a baffle mounted for movement with said stylus and extending into said throat to at least partially seal a stylus aligned segment of said branch passage.

3. The combination of claim 2 wherein said branch passage has inlet and outlet ports leading to and from, respectvely, said main passage at one side of said main passage, and said baffle extends into said throat substantially perpendicularly to the path of movement of said stylus and in sliding engagement with said one side of said main passage to a depth sufficient to overlie the inlet and outlet ports of said branch passage.

4. The combination of claim 1 wherein said printer comprises a rotatable drum for supporting said recording medium, and a linearly translatable carriage for transporting said stylus along said path; and said means for establishing said vacuum includes a bifurcated throat for providing a main air flow passage leading away from said inlet and a branch air flow passage looping back toward said inlet, and a baffle mounted on said carriage for movement with said stylus; said baffle extending into said throat substantially perpendicularly relative to the path of movement of said stylus in position to at least partially seal a stylus aligned segment of said branch passage.

5. The combination of claim 4 wherein said branch passage has inlet and outlet ports at one side of said main passage, and said baffle is maintained in sliding engagement with said one side of said main passage and is of sufficient length to overlie said inlet and outlet ports.

6. A method for collecting waste products released in a pyrographic printer as a stylus moves along a predetermined path to print an image on a recording medium, said method comprising the steps of establishing a non-uniform vacuum substantially adjacent to and coextensive with the entire path of movement for said stylus, and maintaining a relatively strong portion of said vacuum in alignment with said stylus as said stylus moves along said path.

* * * * *